United States Patent
Furuya et al.

(10) Patent No.: US 9,556,991 B2
(45) Date of Patent: Jan. 31, 2017

(54) PIPE JOINT

(75) Inventors: Masayoshi Furuya, Tsukubamirai (JP); Akihito Takanashi, Moriya (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 698 days.

(21) Appl. No.: 13/505,757

(22) PCT Filed: Jan. 25, 2010

(86) PCT No.: PCT/JP2010/050875
§ 371 (c)(1),
(2), (4) Date: May 3, 2012

(87) PCT Pub. No.: WO2011/061947
PCT Pub. Date: May 26, 2011

(65) Prior Publication Data
US 2012/0217742 A1     Aug. 30, 2012

(30) Foreign Application Priority Data
Nov. 18, 2009  (JP) ................................. 2009-263267

(51) Int. Cl.
*F16L 37/091*     (2006.01)
*F16L 41/00*      (2006.01)

(52) U.S. Cl.
CPC .......... *F16L 37/0915* (2016.05); *F16L 41/007* (2013.01)

(58) Field of Classification Search
CPC ..... F16L 37/091; F16L 41/007; F16L 37/0915

(58) Field of Classification Search
USPC .......... 285/39, 322, 319, 910; 277/403, 566, 277/567, 530, 549, 529, 644
See application file for complete search history.

(56) References Cited

U.S. PATENT DOCUMENTS 3,228,705 A * 1/1966 Underwood .................. 277/558
3,822,068 A * 7/1974 Litherland .................... 277/529
(Continued)

FOREIGN PATENT DOCUMENTS

CN    1133417 A    10/1996
CN    1235254 A    11/1999
(Continued)

OTHER PUBLICATIONS

International Search Report Issued Mar. 16, 2010 in PCT/JP10/50875 Filed Jan. 25, 2010.
(Continued)

*Primary Examiner* — James Hewitt
*Assistant Examiner* — Jay R Ripley
(74) *Attorney, Agent, or Firm* — Oblon, McClelland, Maier & Neustadt, L.L.P.

(57) ABSTRACT

A pipe joint has a body, and an annular packing is mounted to the opening of the body into which a fluid tube is inserted. The packing is provided with: a body section having a substantially rectangular cross-sectional shape; and a seal section protruding in the radial direction from the inner peripheral surface of the body section. The seal section is formed at substantially the center of the body section in the widthwise direction thereof and is formed in a triangular cross-sectional shape tapering to the inner peripheral side. When the fluid tube is inserted in the opening, the seal section of the packing makes sliding contact with the outer peripheral surface of the fluid tube.

14 Claims, 9 Drawing Sheets

(56) References Cited

U.S. PATENT DOCUMENTS

| | | | |
|---|---|---|---|
| 5,722,696 A * | 3/1998 | Taneya | F16L 37/0982 285/322 |
| 6,312,019 B1 * | 11/2001 | Nakazumi | F16L 37/091 285/308 |
| 6,869,109 B2 * | 3/2005 | Matsushita | F16L 37/091 285/308 |
| 7,380,836 B2 * | 6/2008 | Bogdanowicz et al. | 285/39 |
| 7,959,161 B2 | 6/2011 | Seki et al. | |
| 2003/0001383 A1 * | 1/2003 | Halama | 285/39 |
| 2003/0122372 A1 * | 7/2003 | Muto | 285/39 |
| 2004/0173976 A1 * | 9/2004 | Boggs | 277/628 |
| 2004/0232697 A1 * | 11/2004 | Tomita | F16L 37/091 285/322 |
| 2005/0217265 A1 | 10/2005 | Popp et al. | |
| 2008/0272588 A1 | 11/2008 | Masson et al. | |

FOREIGN PATENT DOCUMENTS

| | | |
|---|---|---|
| CN | 1264005 A | 8/2000 |
| CN | 1715725 A | 1/2006 |
| CN | 1779310 A | 5/2006 |
| EP | 0 957 306 A2 | 11/1999 |
| EP | 0 957 306 A3 | 11/1999 |
| JP | 3 140697 | 6/1991 |
| JP | 3 96490 | 10/1991 |
| JP | 2000-146046 | 5/2000 |
| JP | 2002-267073 | 9/2002 |
| JP | 2004-514851 | 5/2004 |
| JP | 2005 525517 | 8/2005 |
| JP | 2006 150366 | 6/2006 |
| KR | 10-2005-0074949 | 7/2005 |

OTHER PUBLICATIONS

Extended Search Report issued May 27, 2013 in European Application No. 10831346.1.
Japanese Office Action issued Jun. 10, 2014, in Japan Patent Application No. 2009-263267 (with Partial English translation).
Korean Office Action issued Aug. 5, 2013, in Korea Patent Application No. 10-2012-7011989 (with partial English translation).
Chinese Office Action issued Oct. 24, 2013, in China Patent Application No. 201080052381.8 (with English translation).

* cited by examiner

PIPE JOINT

TECHNICAL FIELD

The present invention relates to a pipe joint to which tubes that serve as an inlet and an outlet for a fluid, for example, are connected.

BACKGROUND ART

Heretofore, a pipe joint has been used for connecting fluid tubes to a fluid pressure device such as a cylinder. Such a pipe joint, for example as disclosed in Japanese Laid-Open Patent Publication No. 03-140697, is equipped with a cylindrical shaped coupling main body portion. In the interior of the coupling main body portion, a ring shaped sealing member is installed, and adjacent to the sealing member, latching pawls are provided, for engagement with a flow passage pipe, which is inserted into the interior of the coupling main body portion. In addition, when the flow passage pipe is inserted from one end side of the coupling main body portion, the sealing member, which has a rectangular shape in cross section, abuts against the outer peripheral surface of the flow passage pipe, so that leakage of the fluid via the outer peripheral surface of the flow passage pipe is prevented. Together therewith, the latching pawls bite into the outer peripheral surface of the flow passage pipe, thus preventing the flow passage pipe from being pulled out.

However, with the pipe joint of Japanese Laid-Open Patent Publication No. 03-140697, when a fluid is supplied from the other end side of the coupling main body portion and flows into the flow passage pipe that is connected to the other end side, the sealing member is pressed toward the latching pawls as a result of the fluid, and by pressing of the latching pawls, the depth at which the pawls bite into the flow passage pipe is made deeper. As a result thereof, when the supply of fluid is halted and the flow passage pipe is taken out from the coupling main body portion, cases are known to occur in which separation of the flow passage pipe is difficult due to the latching pawls biting excessively into the flow passage pipe.

Further, when the flow passage pipe is installed with respect to the coupling main body portion, the sealing member is pressed by the flow passage pipe, thereby deforming and displacing the sealing member. However, in this case, since there is no space into which the contact portion with the flow passage pipe can move, deformation of the contact portion is obstructed, and as a result, resistance occurs when the flow passage pipe is inserted.

Furthermore, in a situation where the flow passage pipe is installed with respect to the coupling main body portion, as a result of the sealing member being pressed upon and displaced by the fluid that flows through the interior of the coupling main body, the contact area of the sealing member with respect to the outer circumferential surface of the flow passage pipe is reduced, and there is a concern that the sealing characteristics of the sealing member may be deteriorated.

SUMMARY OF INVENTION

A general object of the present invention is to provide a pipe joint, which enhances operability when a tube is both installed and separated from a body portion, and in which sealing characteristics of the pipe joint are improved.

The present invention is characterized by a pipe joint including a body into which a tube is inserted, a chuck disposed in the interior of the body and which retains the tube in the body by engagement with an outer peripheral surface of the tube, a guide member that guides the chuck along an axial direction, a packing disposed in the interior of the body for maintaining a fluidtight condition between the body and the tube, and a release member for releasing the chuck from the tube when the tube is taken out from the body. The packing further includes a ring shaped main body portion, and a sealing member, which projects in a radial inward direction with respect to the main body portion, the sealing member abutting against an outer peripheral surface of the tube, wherein a width dimension of the sealing member along the axial direction of the body is set to be smaller than a width dimension of the main body portion.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
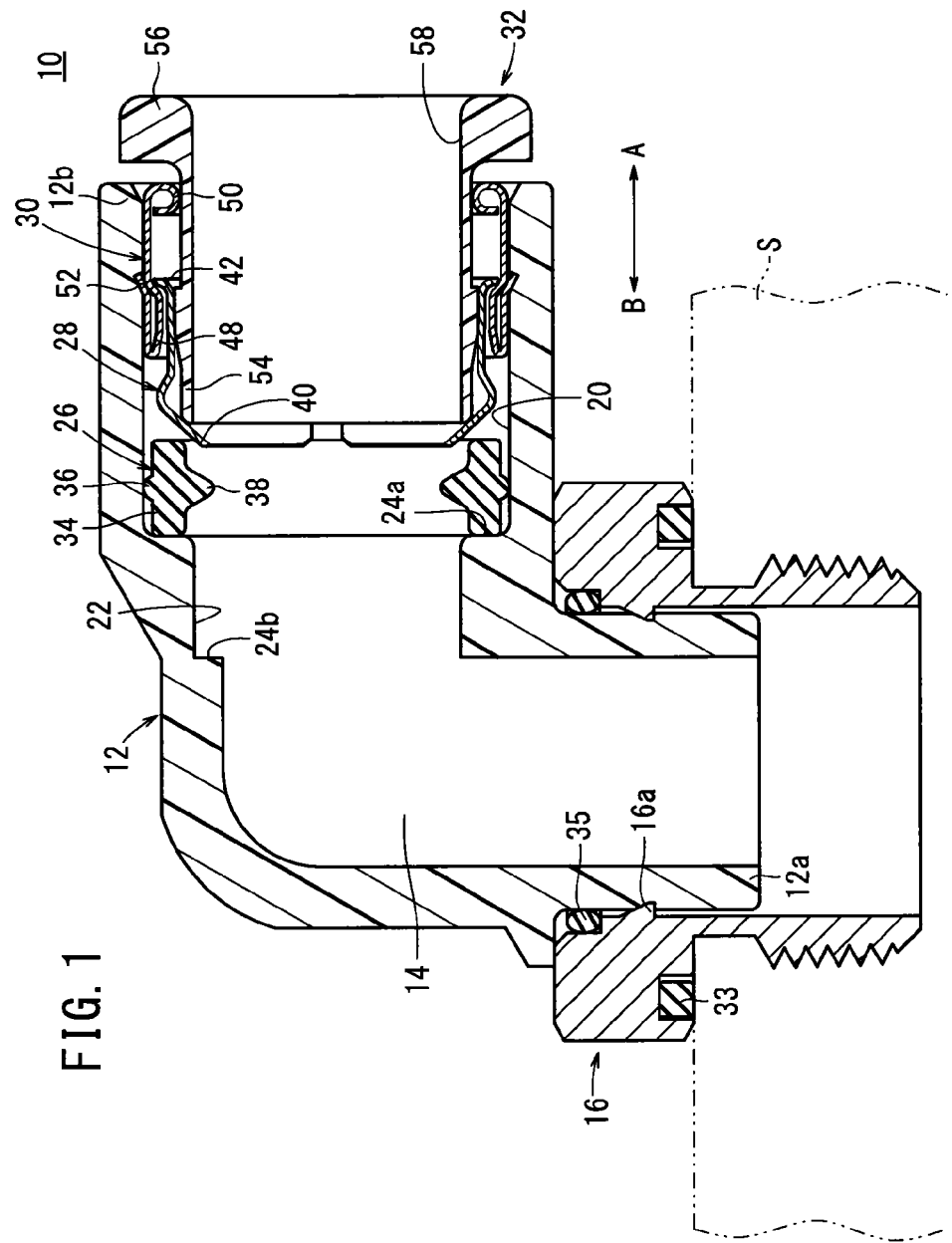
FIG. 1 is an overall cross sectional view of a pipe joint according to a first embodiment of the present invention.
Figure 2:
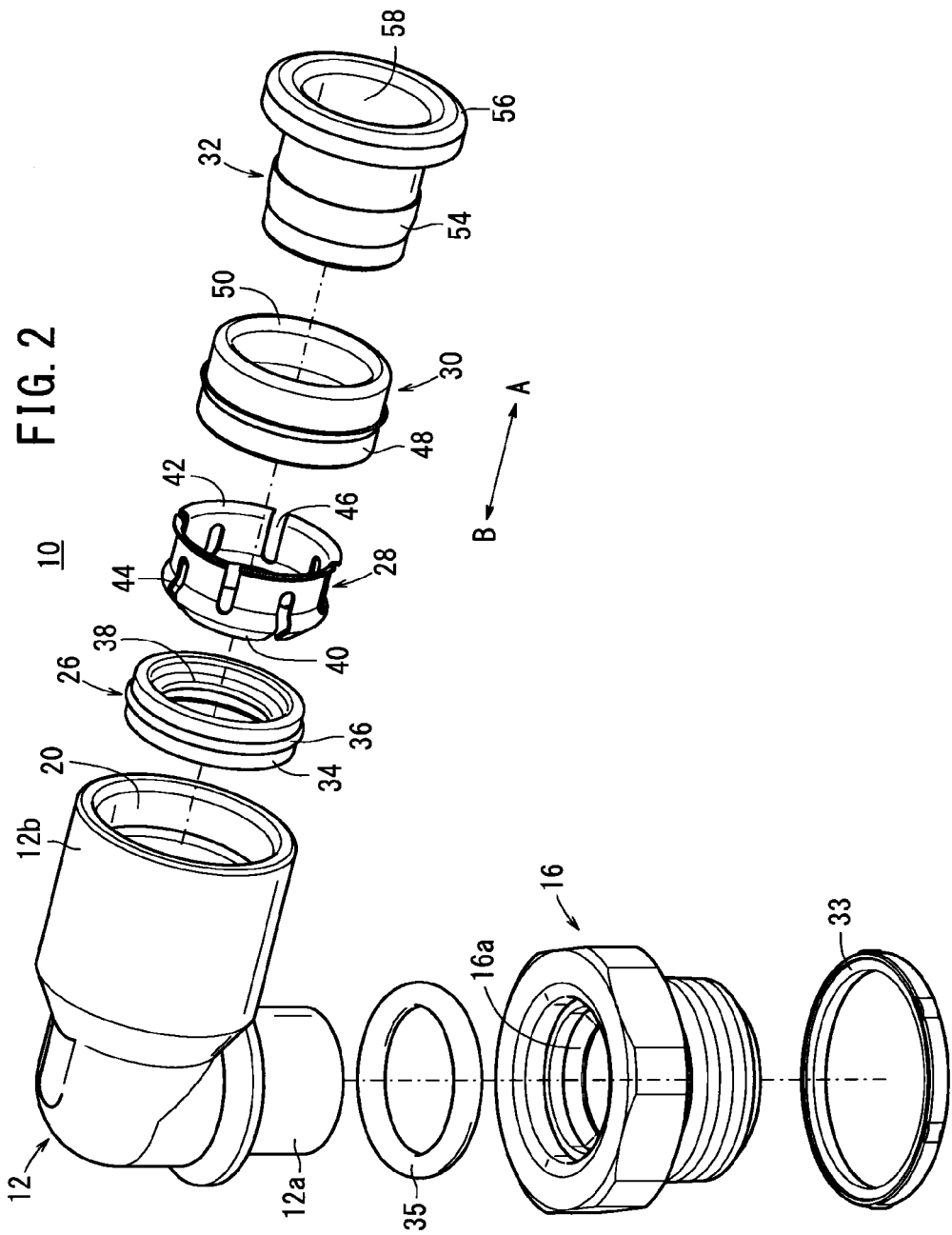
FIG. 2 is an exploded perspective view of the pipe joint shown in FIG. 1.

In FIG. 1, reference number 10 indicates a pipe joint according to a first embodiment of the present invention.

As shown in FIGS. 1 through 4, the pipe joint 10 is equipped with a tubular shaped body 12, formed from a resin material, which is bent substantially in an L-shape. A fluid passage 14 through which a fluid flows along the body 12 is formed in the interior of the body 12. Additionally, the fluid passage 14 opens at one end 12a and at another end 12b of the body and communicates with the exterior.

An adapter 16 is fitted onto one end 12a of the body 12 for facilitating attachment of the pipe joint 10 to another apparatus S. Conversely, on the other end 12b of the body 12, an opening 20 is formed, into which a fluid tube (tube) 18 is inserted, together with a connection passage 22 that connects the opening 20 with the fluid passage 14. The aforementioned body 12 is not limited to the case of being formed from a resin material, and may be formed from a metallic material, for example, stainless steel.

The opening is formed with a substantially constant diameter, and is connected to and communicates with the connection passage 22, which is reduced in diameter radially inward with respect to the opening 20. Further, the connection passage 22 communicates with the fluid passage 14, which is further reduced in diameter with respect to the connection passage 22. A step is formed at a boundary portion 24a between the opening 20 and the connection passage 22, and similarly, another step is formed at a boundary portion 24b between the connection passage 22 and the fluid passage 14. Additionally, the fluid tube 18 is inserted past the opening 20 from the other end 12b of the body 12 and is inserted into the connection passage 22, whereupon the tube abuts against and engages with the boundary portion 24b between the connection passage 22 and the fluid passage 14.

Midway between the one end 12a and the other end 12b of the body 12, the fluid passage 14 extends and is bent substantially in an L-shape, corresponding to the shape of the body 12.

On the other hand, in the opening 20, there are disposed, respectively, an annular packing 26, a chuck 28 inserted into the body 12 for latching engagement with the fluid tube 18, a guide 30 engaged with an inner circumferential surface of the opening 20, and a release bush (release member) 32, which is disposed displaceably along the guide 30.

On the outer peripheral surface of the one end 12a side of the body 12, a region for mounting of the adapter 16 is formed, which is recessed radially inward. Additionally, when the adapter 16 is inserted thereon, a projection 16a that projects radially inward from the inner circumferential side of the adapter 16 bites into the outer peripheral surface of the one end 12a, thereby securing the adapter to the one end 12a. Further, an annular sealing member 33 is installed on the lower surface of the adapter 16. By abutment of the sealing member 33 against an upper surface of the apparatus S, external leakage of fluid between the adapter 16 and the apparatus S is prevented.

Furthermore, on the inner circumferential surface of the adapter 16, an o-ring 35 is mounted via an annular groove. By abutment of the o-ring 35 against the outer peripheral surface of the end 12a of the body 12, leakage of fluid from between the adapter 16 and the body 12 can reliably be prevented.

Figure 3:
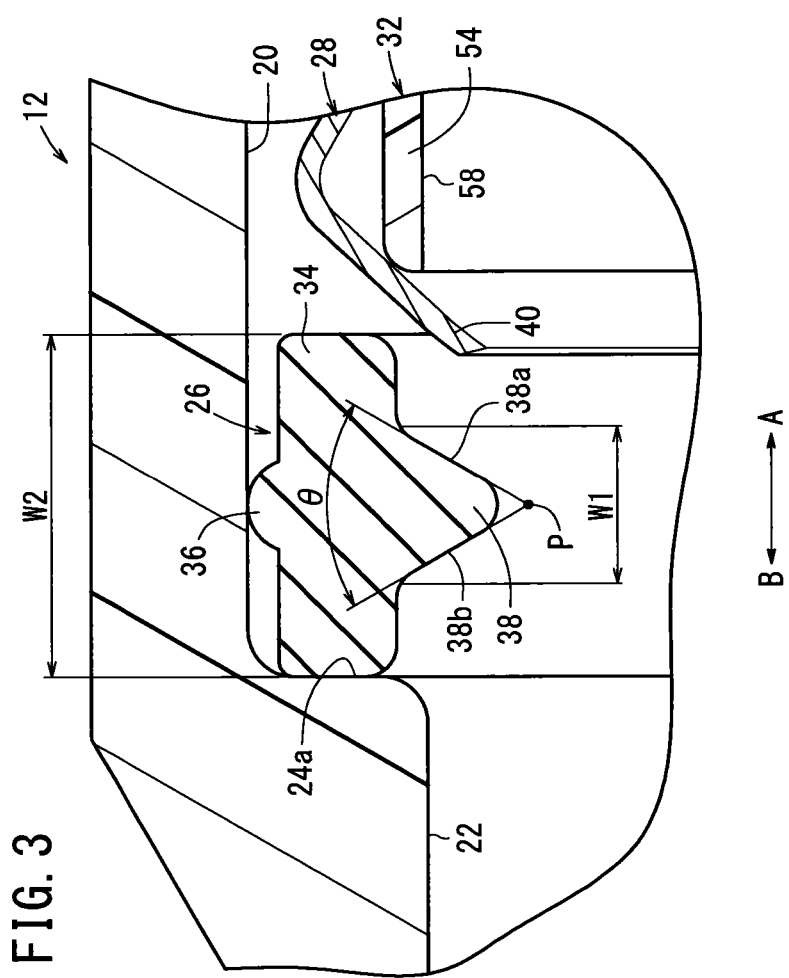
FIG. 3 is an enlarged cross sectional view showing the vicinity of a packing in the pipe joint of FIG. 1.
Figure 4:
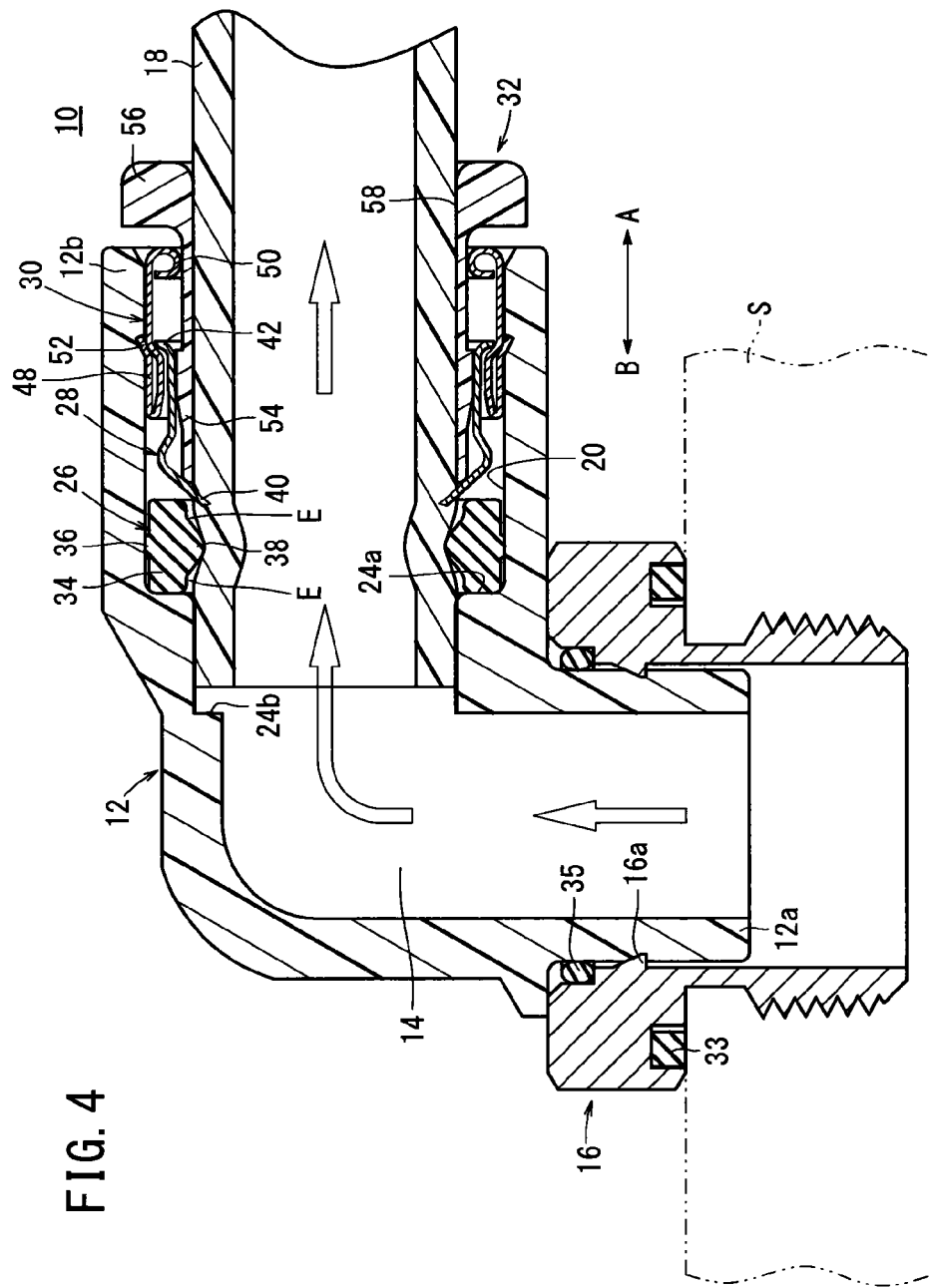
FIG. 4 is an enlarged crossed sectional view showing a condition in which a fluid tube is inserted into and latched with respect to the pipe joint of FIG. 1.

As shown in FIG. 3, the packing 26 having a substantially T-shape in cross section is formed from an elastic material such as rubber or the like. The packing 26 is arranged for abutment on the boundary portion 24a with the fluid passage 14, in the interior of the opening 20. The packing 26 includes a main body portion 34 having a substantially elongate shape in cross section, a bulging portion 36 that abuts against the inner circumferential surface of the opening 20, and a sealing member 38 that projects radially inward from an inner circumferential surface of the main body portion 34 and which is in sliding contact with the outer peripheral surface of the fluid tube 18.

One end surface of the main body portion 34 abuts against the boundary portion 24a, whereas the other end surface thereof is disposed to face toward the other end 12b side (in the direction of the arrow A) of the body 12. The inner circumferential surface and the outer peripheral surface of the main body portion 34 are arranged substantially in parallel with the inner circumferential surface of the opening 20.

The bulging portion 36 is formed with a substantially hemispherical shape in cross section, projecting in a radial outward direction at a predetermined height with respect to the outer peripheral surface of the main body portion 34, and is formed in an annular shape along the outer peripheral surface. Further, the bulging portion 36 is formed substantially in the center along the widthwise direction (the direction of arrows A and B) of the main body portion 34. Also, since the bulging portion 36 abuts against the inner circumferential surface of the opening 20, the outer peripheral surface of the main body portion 34 is maintained at a predetermined distance with respect to the inner circumferential surface of the opening 20.

As shown in FIG. 3, the sealing member 38 is formed with a triangular shape in cross section, projecting in a radial inward direction at a predetermined height with respect to the inner circumferential surface of the main body portion 34. The tip end of the sealing member 38 is formed with a rounded shape in cross section, while also being formed in an annular shape along the inner circumferential surface of the main body portion 34, which itself is formed in an annular shape. The sealing member 38 is formed substantially in the center along the widthwise direction (the direction of arrows A and B) of the main body portion 34. More specifically, the widthwise dimension W1 of the sealing member 38 is set to be smaller than the widthwise dimension W2 of the main body portion 34 (W1<W2). Stated otherwise, on the packing 26, the sealing member 38 is formed to be narrower than the main body portion 34. Owing thereto, in the vicinity of the packing 26, spaces E are defined (see FIG. 4) respectively facing toward the inner circumferential side of the main body portion 34 and toward both sides of the sealing member 38.

Further, the sealing member 38 is disposed on the packing 26 substantially along a straight line with the bulging portion 36 in the radial inward direction.

On the sealing member 38, imaginary lines extend respectively from two inclined surfaces 38a, 38b of the sealing member 38 toward the inner circumferential side, with an angle of inclination θ being formed about the point P where the imaginary lines intersect, for example, within a range of from 80° to 100° (80°≤θ≤100°). The angle of inclination θ optimally is set at 90° (θ=90°).

The aforementioned packing 26 is not limited to being formed from an elastic material as described above, and may also be formed from a resin material, for example. More specifically, the packing 26 may be formed of any material capable of effectively preventing leakage of fluid from between the body 12 and the fluid tube 18, at a time when the packing 26 abuts against the inner circumferential surface of the opening 20 and the outer peripheral surface of the fluid tube 18.

The chuck 28, for example, is formed in a substantially cylindrical shape by press-forming a thin-plate material, comprising inclined pawls 40 formed on one end thereof, which are inclined in a radial inward direction, and the latching members 42 formed on the other end thereof, which are bent in a radial outward direction. Further, on the one end side of the chuck 28, first slits 44 are formed, which are cut out at predetermined lengths toward the other end side (in the direction of the arrow A). The first slits 44 are disposed in plurality (for example, four slits), which are spaced at equal intervals along the circumferential direction of the chuck 28.

On the other hand, on the other end side of the chuck 28, second slits 46 are formed, which are cut out at predetermined lengths toward the one end side (in the direction of the arrow B). The second slits 46 also are disposed in plurality (for example, four slits), which are spaced at equal intervals along the circumferential direction of the chuck 28.

Stated otherwise, the first slits 44 and the second slits 46 are disposed in mutually different directions along the circumferential direction of the chuck 28.

Additionally, the one end of the chuck 28 is capable of being reduced in diameter in a radial inward direction through the first slits 44, whereas the other end of the chuck 28 is capable of being reduced in diameter in a radial inward direction through the second slits 46. Owing thereto, the pawls 40 and latching members 42 that constitute the chuck 28 are formed elastically, so as to be capable of expanding as well as reducing in diameter.

The ends of the pawls 40 are formed with a blade-like shape and are a capable of piercing into the outer peripheral surface of the fluid tube 18.

The guide 30, similar to the aforementioned chuck 28, is formed in a substantially cylindrical shape by press-forming a thin-plate material, and is arranged in abutment with the inner circumferential surface of the opening 20. One end of the guide 30 is disposed in the opening 20 alongside the packing (in the direction of the arrow B), and is reduced in diameter somewhat in the radial inward direction. Further, at the tip end thereof, the guide 30 is formed with a front end portion 48, which is bent backward toward the other end side (in the direction of the arrow A) of the guide 30. Further, the other end side of the guide 30 is formed with a rear end portion 50, which is bent with a rounded shape in cross section in a radial inward direction.

The end part of the front end portion 48 is bent radially outward and is inserted into a groove 52 (see FIG. 5) formed in the inner circumferential surface of the body 12. As a result thereof, when the guide 30 is inserted into the opening 20 of the body 12, the guide 30 is held in intimate contact with the inner circumferential surface of the opening 20, and together therewith, through engagement of the end part of the front end portion 48 in the groove 52, the guide 30 becomes fixed in place under a condition in which displacement thereof in the axial direction (the direction of arrows A and B) is regulated.

Further, the chuck 28 is disposed on the inner circumferential side of the front end portion 48, such that by abutment of the latching members 42 of the chuck 28 against the end part of the front end portion 48, displacement of the chuck 28 toward the packing 26 side (in the direction of the arrow B) also is regulated.

On the other hand, the rear end portion 50 is arranged substantially at the same position as the other end 12b of the body 12, and the inner circumferential side thereof is held in sliding contact with the outer peripheral surface of the release bush 32. More specifically, the rear end portion 50 of the guide 30 functions as a guide means, which is capable of guiding displacement of the release bush 32 along the axial direction thereof.

In this manner, the guide 30 regulates displacement of the chuck 28 along the axial direction (in the direction of arrows A and B), and the guide 30 also serves to guide the release bush 32 along the axial direction.

The release bush 32 is formed in a tubular shape, for example, from a resin material. One end side of the release bush 32 is inserted into the inner circumferential side of the guide 30 and the chuck 28 in the opening 20. The one end side bulges in a radial outward direction, and is formed with a tapered portion 54, which is reduced in diameter gradually toward the tip end side thereof. The tapered portion 54 is disposed so as to confront the pawls 40 of the chuck 28.

Further, the other end side of the release bush 32 is formed with a flange 56, which is expanded in diameter in the radial outward direction. The outer circumferential diameter of the flange 56 is formed to be larger than the opening 20.

Furthermore, a penetrating hole 58 through which the fluid tube 18 is inserted penetrates along the axial direction (the direction of arrows A and B) and is formed in the interior of the release bush 32. The inner circumferential diameter of the penetrating hole 58 is formed with a substantially constant diameter, which is slightly larger than the outer circumferential diameter of the fluid tube 18.

The pipe joint 10 according to the first embodiment of the present invention is constructed basically as described above. Next, operations and effects of the pipe joint 10 shall be explained. In this case, the one end of the pipe joint 10 is in a condition where it is affixed to the apparatus S (see FIG. 1), as a result of threaded engagement therewith beforehand through the adapter 16.

As shown in FIG. 1, in an non-installed state in which the fluid tube 18 is not installed in the pipe joint 10, the fluid tube 18, which is connected to an unillustrated fluid pressure apparatus or the like, is inserted from the opening 20 along the penetrating hole 58 of the release bush 32 (see FIG. 4), whereupon the end surface of the fluid tube 18 abuts against the boundary portion 24b of the body 12.

Figure 5:
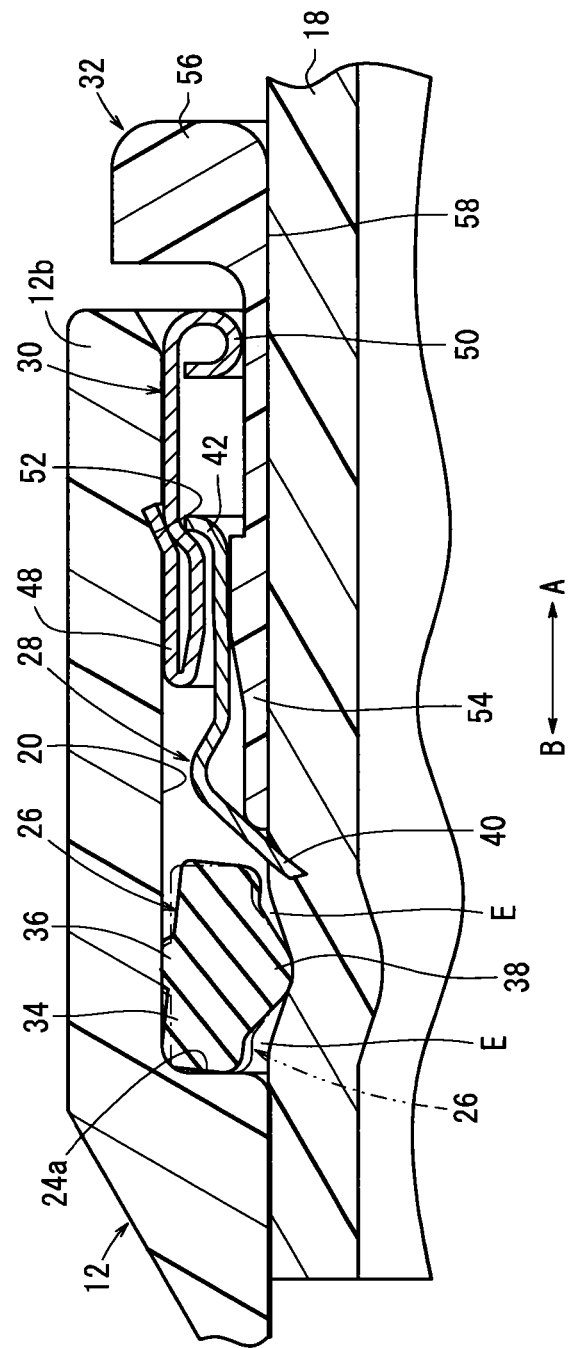
FIG. 5 is an enlarged cross sectional view showing the vicinity of a packing when the fluid tube is inserted from another end side of the body.

At this time, as shown in FIG. 5, because due to insertion of the fluid tube 18, the packing 26 is pressed toward the one end 12a side of the body 12, the sealing member 38 of the packing 26, which is in sliding contact with the fluid tube 18 about a fulcrum of the bulging portion 36, is pressed forcibly so as to approach toward the side of the boundary portion 24a (in the direction of the arrow B).

In the packing 26, in comparison with the packing utilized in a conventional pipe joint, because material is removed from between the side of the sealing member 38 and the inner circumferential side of the main body portion 34, rigidity of the packing 26 is reduced, while in addition, the deformed sealing member 38 can be caused to moved suitably within the spaces E disposed between the sealing member 38 and the boundary portion 24a.

As a result, when the fluid tube 18 is inserted with respect to the body 12, the sealing member 38, which is deformed by contact with the fluid tube 18, is capable of being moved, and since there is no impediment to insertion of the fluid tube 18, the fluid tube 18 can be inserted smoothly.

Further, by insertion of the fluid tube 18 through the interior of the packing 26, the packing 26 is pressed in a radial outward direction, and the bulging portion 36 is pressed and deformed with respect to the inner circumferential surface of the opening 20. Owing thereto, a fluidtight state between the body 12 and the packing 26 can reliably be maintained. At the same time, on the packing 26, the sealing member 38, which is triangularly shaped in cross section, is held in sliding contact with the outer peripheral surface of the fluid tube 18, and further, because the sealing member 38 becomes deformed and crushed by the pressing force from the fluid tube 18, the fluidtight state between the packing 26 and the fluid tube 18 can reliably be maintained.

Furthermore, concerning the sealing member 38 of the packing 26, because the contact area thereof with respect to the outer peripheral surface of the fluid tube 18 is smaller compared with the packing used in a conventional pipe joint, when the fluid tube 18 is inserted while in sliding contact with the sealing member 38, resistance is lessened, and accompanying such a reduction in contact area, because the pressing force of the contact portion with respect to the outer peripheral surface increases, the sealing performance of the sealing member 38 is improved.

On the other hand, the one end of the chuck 28 is pressed and enlarged in a radial outward direction by the fluid tube 18, whereby the pawls 40 come into abutment against the outer peripheral surface of the fluid tube 18. Thereafter, when the fluid tube 18 is pulled slightly in a direction away from the one end 12a of the body 12, the pawls 40, which abut against the outer peripheral surface, pierce (bite) into the outer peripheral surface as a result of the fluid tube 18 being pulled. Owing thereto, the fluid tube 18 attains a state of reliable engagement with the body 12 of the pipe joint 10 owing to the pawls 40 of the chuck 28, which bite into the outer peripheral surface of the fluid tube 18.

In addition, by supplying a fluid with respect to the body 12 through another apparatus S connected to the one end 12a of the body 12, the fluid flows through to the other end 12b of the body 12 along the fluid passage 14, whereupon the fluid that has flowed through the connection passage 22 passes through the interior of the fluid tube 18 and flows to the exterior of the body 12. At this time, since the packing 26 abuts against the opening 20 of the body 12 through the bulging portion 36 while the sealing member 38 also abuts against the outer peripheral surface of the fluid tube 18, leakage of fluid between the body 12 and the fluid tube 18 is reliably prevented.

On the other hand, in the case that the aforementioned fluid tube 18 is to be detached from the pipe joint 10, the flange 56 of the release bush 32 is pressed toward the side of the body 12 (in the direction of the arrow B), whereupon, by displacement of the release bush 32, the tapered portion 54 presses the pawls 40 of the chuck 28, so that the pawls 40 are displaced in a direction to separate away and become disengaged from the outer peripheral surface of the fluid tube 18. Specifically, the pawls 40 are pressed in a radial outward direction away from the outer peripheral surface of the fluid tube 18.

Figure 6:
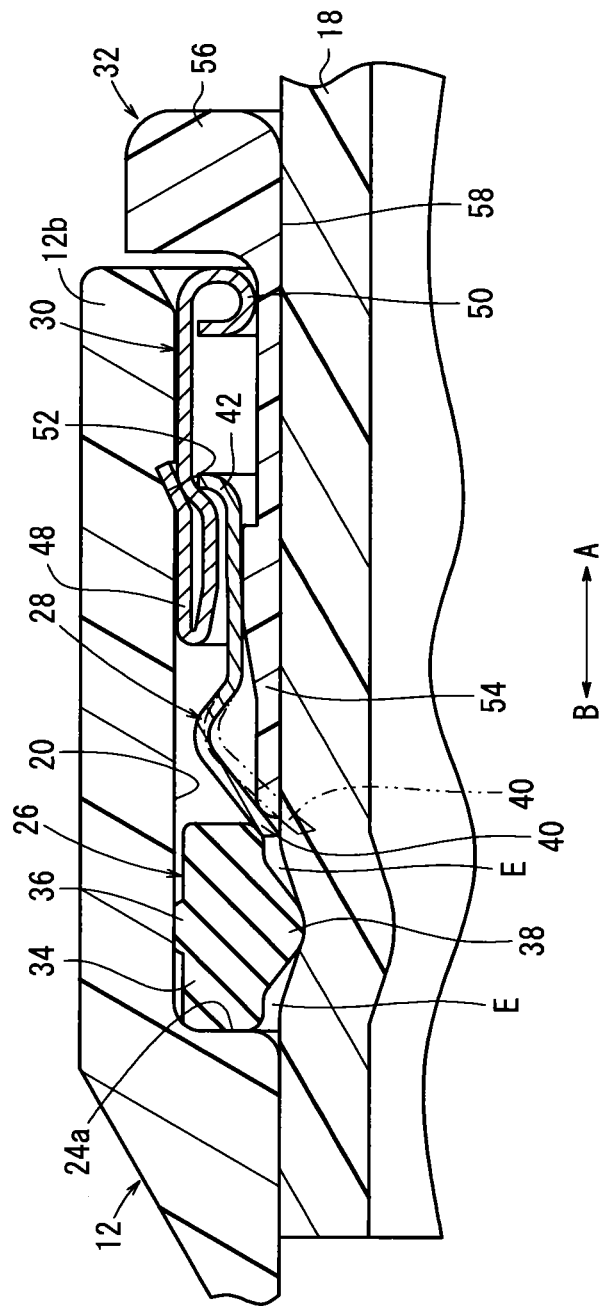
FIG. 6 is an enlarged cross sectional view showing the vicinity of a packing when the fluid tube is released from a latched state by operation of a release bushing.

At this time, because the packing 26, which lies adjacent to the pawls 40, is of a shape wherein only the sealing member 38 projects toward the inner circumferential side with respect to the main body portion 34, when the pawls 40 are moved radially outward, contact with the packing 26 is avoided (see FIG. 6). More specifically, since the packing is formed with portions thereof removed between the inner circumferential side of the main body portion 34 and the sides of the sealing member 38, the pawls 40 are capable of being moved and positioned into the spaces E, whereby pressing of the packing 26 by the pawls 40 is suppressed, and resistance upon disengagement of the pawls 40 from the fluid tube 18 can reliably be alleviated.

Stated otherwise, when the pawls 40 of the chuck 28, which are pressed by the release bush 32, are moved in a radial outward direction, escape portions are provided, which enable the packing 26 to avoid contact with the pawls 40.

Owing thereto, the other end of the chuck 28 is pressed forcibly in a radial outward direction by the release bush 32, whereby the pawls 40, which pierce into the outer peripheral side of the fluid tube 18, separate away from the outer peripheral surface of the fluid tube 18, whereby the latched condition of the fluid tube 18 by the chuck 28 is released.

In addition, as a result of pulling the fluid tube 18 in a direction (the direction of the arrow A) so as to separate away from the one end 12a of the body 12, the fluid tube 18 is taken out from the pipe joint 10. More specifically, when the pawls 40 of the chuck 28 are pressed by the release bush 32 and are separated from the fluid tube 18, since there is no contact between the packing 26 adjacent to the pawls 40 and the pawls 40 themselves, the pawls 40 can be reliably and easily disengaged from the fluid tube 18.

As a result, compared to the conventional pipe joint, in which there was a concern that separation of the pawls 40 would be incomplete due to contact of the chuck 28 with the packing 26, the operational force required upon pulling out the fluid tube 18 from the body 12 can be lessened, and the fluid tube can be easily taken out.

Figure 7:
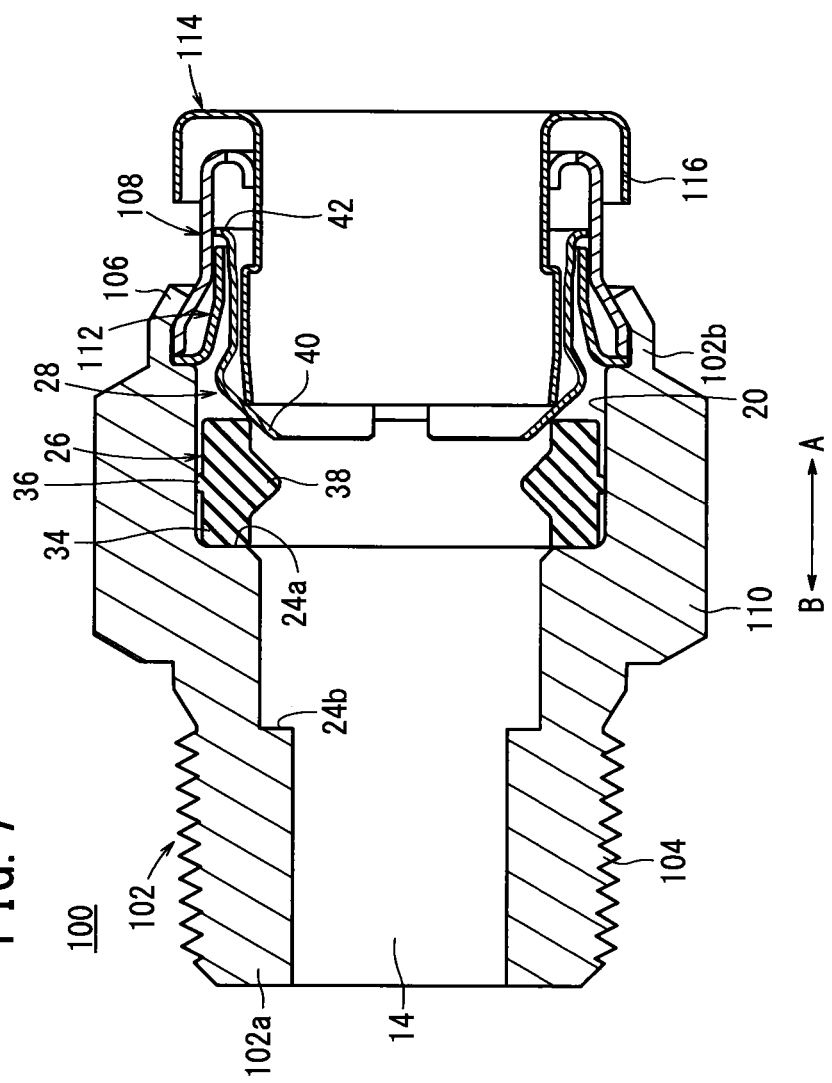
FIG. 7 is an overall cross sectional view of a pipe joint according to a second embodiment of the present invention.
Figure 8:
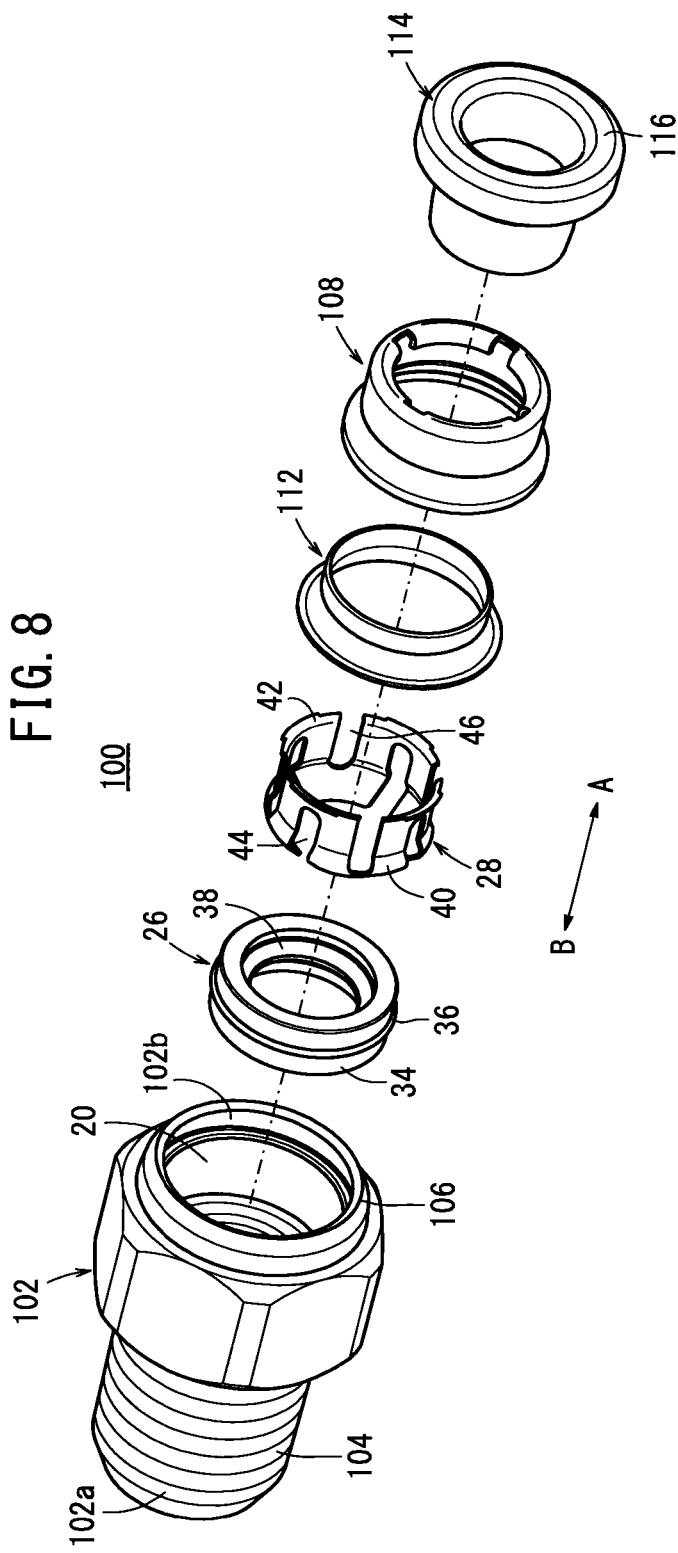
FIG. 8 is an exploded perspective view of the pipe joint shown in FIG. 7.
Figure 9:
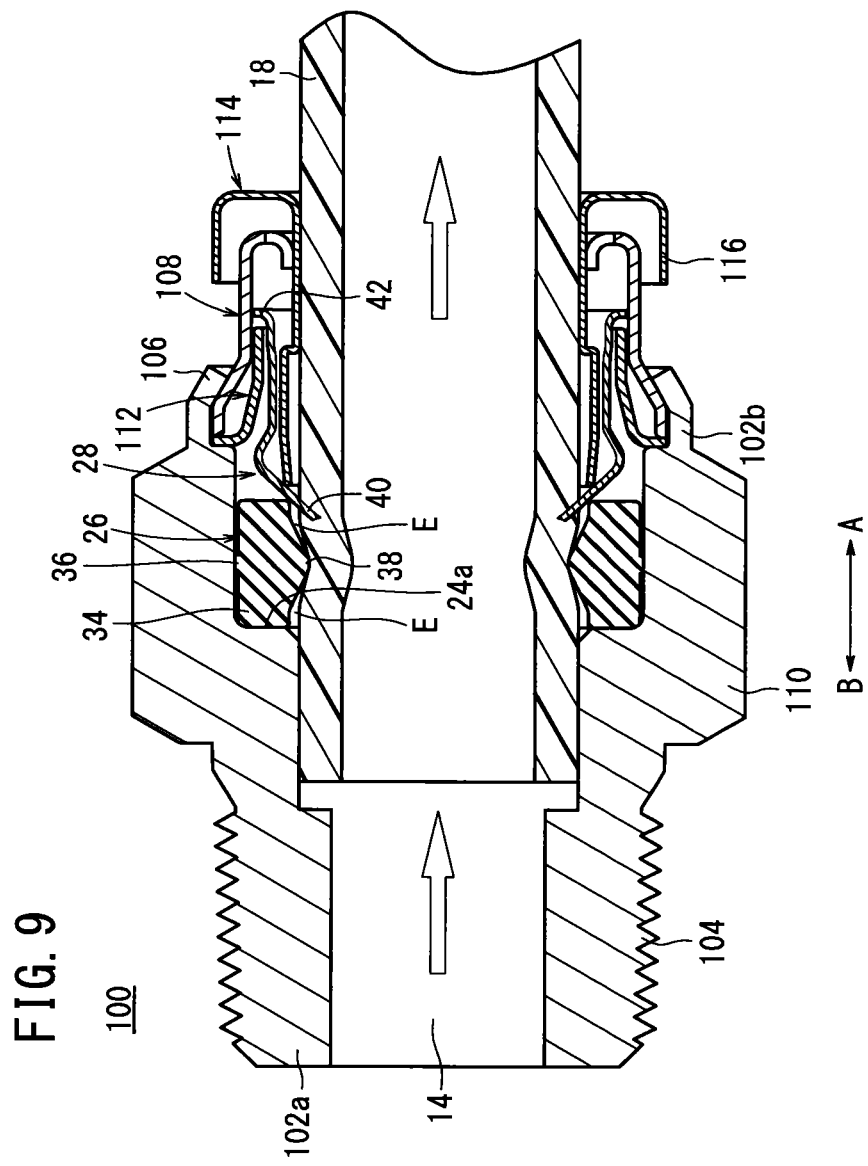
FIG. 9 is an enlarged crossed sectional view showing a condition in which a fluid tube is inserted into and latched with respect to the pipe joint of FIG. 7.

Next, a pipe joint 100 according to a second embodiment of the present invention is shown in FIGS. 7 through 9. Structural features thereof which are the same as those of the pipe joint 10 according to the first embodiment shall be designated using the same reference numerals, and detailed descriptions of such features shall be omitted.

As shown in FIGS. 7 through 9, the pipe joint 100 according to the second embodiment differs from the pipe joint 10 according to the first embodiment, in that a body 102, for example, is formed from a metallic material, which is formed in a straight line fashion along the axial direction.

In the pipe joint 100, on the outer peripheral surface of one end 102a of the body 102, there is provided a threaded portion 104, which is connected to an unillustrated pipe fitting or the like, whereas on the other end portion thereof, a thin-walled crimping portion 106 is formed. After a guide 108 has been inserted into the opening 20 of the body 102, the guide 108 is integrally crimped thereto as a result of deforming the crimping portion 106 in a radial inward direction by means of a non-illustrated crimping tool or the like.

Further, substantially in the center along the axial direction (the direction of arrows A and B), a tightening nut 110 is formed, which is hexagonally shaped in cross section, and which is used when the pipe joint 100 is connected to a pipe fitting using a non-illustrated tool.

The guide 108, for example, is formed in a tubular shape from a metallic material. One end thereof on the side of the body 102 (in the direction of the arrow B) is expanded radially outward via an inclined portion, and is affixed onto the other end 102b of the body 102 by means of crimping. The other end portion of the guide 108 is disposed so as to project outwardly from the opening 20 of the body 102, together with being bent so as to turn inward toward the inner circumferential side.

Further, on the inner circumferential side of the guide 108, a tubular shaped ring body 112 is provided, one end of which is bent in a radial outward direction. Additionally, the outer edge of the ring body 112 is affixed by being sandwiched between the crimping portion 106 of the body 102 and one end part of the guide 108. Also, the ring body 112 is reduced in diameter gradually from one end to the other end thereof, and is arranged substantially in parallel with the axis of the body 102.

The chuck 28 is inserted through the interior of the ring body 112. The pawls 40 of the chuck 28 are disposed on one end 102a side (in the direction of the arrow B) of the body 102, and the latching members 42 are disposed on the other end side (in the direction of the arrow A) of the ring body 112. Additionally, by abutment of the latching members 42, which are bent radially outward, against the other end of the ring body 112, displacement of the chuck 28 toward the one end 102a side of the body (in the direction of the arrow B) is regulated. The packing 26 is disposed closer to the one end 102a of the body 102 than the chuck 28.

On the other hand, the release bush 114 is formed in a substantially cylindrical shape, for example, by press-forming a thin plate material. One end of the release bush 114 is inserted into the interior of the body 102, whereas on the other end thereof, a flange 116 is formed, which is bent radially outward and expanded in diameter. The flange 116 is disposed so as to be exposed on the outside of the body 102.

With the second embodiment constructed as described above, in a pipe joint 100, which includes the body 102 formed from a metallic material and which extends in a straight line fashion along the axial direction (the direction of arrows A and B), by use of the packing 26 comprising the main body portion 34, the sealing member 38 that projects in a triangular shape with respect to the main body portion 34 toward the inner circumferential side, and the bulging portion 36 that bulges outwardly from the main body portion 34, when the fluid tube 18 is inserted into the body 102, since compared to the packing used in the conventional pipe joint, the contact area between the sealing member 38 and the fluid tube 18 is reduced, resistance upon insertion of the fluid tube 18 while in sliding contact with the sealing member 38 is lessened. Together therewith, since accompanying such a reduction in contact area, the pressing force from the sealing member 38 with respect to the outer peripheral surface of the fluid tube 18 also increases, the sealing characteristics of the sealing member 38 can be enhanced.

Further, when the fluid tube 18, which is in latching engagement with the body 102 by the chuck 28, is released, the release bush 114 is pressed, and although the pawls 40 of the chuck 28 are made to move in the radial outward direction, since the packing 26 is formed with a T-shape in cross section, the amount of contact between the pawls 40 and the packing 26 alongside the pawls 40 is reduced, and along therewith, when the pawls 40 separate away from the fluid tube 18, resistance is reliably lessened, whereby the pawls 40 can be released reliably and easily from the fluid tube 18. As a result, compared to the conventional pipe joint, in which there was a concern that separation of the pawls 40 would be incomplete due to contact of the chuck 28 with the packing 26, the operational force required upon pulling out the fluid tube 18 from the body 12 can be lessened, and the fluid tube can be easily taken out.

The pipe joint according to the present invention is not limited to the aforementioned embodiments, and it is a matter of course that various configurations could be adopted without deviating from the essence and gist of the invention.

The invention claimed is:
1. A pipe joint, comprising:
   a body into which a tube is insertable;
   a chuck disposed in an interior of the body and which retains the tube in the body by engagement with an outer peripheral surface of the tube, a first end of the chuck including a pawl that is angled radially inward and a second end of the chuck, which is opposite to the first end, including a latch that is angled radially outward;
   a guide member that guides the chuck along an axial direction, the guide member including a front end portion located between the pawl and the latch of the chuck in the axial direction and the latch extends radially outward further than an innermost portion of the front end portion;
   a packing disposed in the interior of the body for maintaining a fluidtight condition between the body and the tube, the packing being spaced apart from the chuck such that the packing does not contact the pawl of the chuck when the pawl is in contact with the fluid tube and does not contact the pawl of the chuck when the pawl is disengaged from the fluid tube; and
   a release member for releasing the chuck from the tube when the tube is taken out from the body,
   the packing further comprising:
      a ring shaped main body portion including an inner circumferential surface and an outer peripheral surface, the inner circumferential surface and the outer peripheral surface being substantially in parallel with an inner circumferential surface of the body; and
      a single sealing member, which projects from a central portion of the inner circumferential surface of the main body portion in a radial inward direction with respect to the main body portion, the sealing member abutting against the outer peripheral surface of the tube,
   wherein a width dimension of the sealing member along the axial direction of the body is set to be smaller than a width dimension of the main body portion,
   wherein a side surface of the main body portion abuts against a boundary in the interior of the body, and
   wherein a space is provided between the sealing member and boundary in the interior of the body,
   wherein no element of the pipe joint is positioned between the pawl of the chuck and the packing.

2. A pipe joint according to claim 1, wherein the packing is disposed adjacent to the pawl of the chuck that bites into the outer peripheral surface of the tube.

3. A pipe joint according to claim 1, wherein the packing further comprises a bulging portion that extends from a central portion of the outer peripheral surface of the main body portion and abuts against the inner circumferential surface of the body such that terminal ends of the outer peripheral surface of the main body portion are spaced apart from the inner circumferential surface of the body, the terminal ends being positioned outside of the central portion of the outer peripheral surface of the main body portion.

4. A pipe joint according to claim 1, wherein a side surface of the main body portion abuts against a boundary in the interior of the body, which is formed between a first opening in which the packing is installed and a second opening that is smaller in diameter than the first opening.

5. A pipe joint according to claim 1, wherein an end of the front end portion of the guide member is bent backwards towards an opposite end of the guide member.

6. A pipe joint according to claim 5, wherein the opposite end of the guide member includes a rear end portion that is bent with a rounded shape in cross section in a radial inward direction.

7. A pipe joint according to claim 1, wherein the first end of the chuck includes a first plurality of slits extending towards the second end of the chuck, and the second end of the chuck includes a second plurality of slits extending towards the first end of the chuck.

8. A pipe joint according to claim 7, wherein individual slits of the first plurality of slits are spaced at equal intervals along a circumferential direction of the chuck.

9. A pipe joint according to claim 7, wherein individual slits of the second plurality of slits are spaced at equal intervals along a circumferential direction of the chuck.

10. A pipe joint according to claim 1, wherein the sealing member is formed with a tapered shape in cross section, which tapers from the main body portion toward an inner circumferential side of the sealing member.

11. A pipe joint according to claim 10, wherein the sealing member is formed with a triangular shape in cross section.

12. A pipe joint according to claim 11, wherein the sealing member is formed with an angle of inclination of 90° at a point of intersection between one inclined surface and another inclined surface that constitute the cross sectional shape.

13. A pipe joint according to claim 11, wherein the sealing member is formed with an angle of inclination within a range of 80° to 100° at a point of intersection between one inclined surface and another inclined surface that constitute the cross sectional shape.

14. A pipe joint according to claim 13, wherein the space is provided between one of the inclined surfaces and a terminal end of the inner circumferential surface of the main body portion, the terminal end being positioned outside of the central portion of the inner circumferential surface of the main body portion.

* * * * *

UNITED STATES PATENT AND TRADEMARK OFFICE
CERTIFICATE OF CORRECTION

PATENT NO. : 9,556,991 B2  
APPLICATION NO. : 13/505757  
DATED : January 31, 2017  
INVENTOR(S) : Masayoshi Furuya et al.

Page 1 of 1

It is certified that error appears in the above-identified patent and that said Letters Patent is hereby corrected as shown below:

In the Claims

Column 9, Line 67, Claim 1, change "with the fluid tube" to --with the tube--.

Column 10, Line 2, Claim 1, change "disengaged from the fluid tube" to --disengaged from the tube--.

Signed and Sealed this
Tenth Day of April, 2018

Andrei Iancu
*Director of the United States Patent and Trademark Office*